US008505176B2

(12) United States Patent
Ueda et al.

(10) Patent No.: US 8,505,176 B2
(45) Date of Patent: Aug. 13, 2013

(54) SNAP RING ATTACHMENT AND SNAP RING ATTACHING TOOL

(75) Inventors: Michitomo Ueda, Tokyo (JP); Kotaro Takamura, Tokyo (JP); Yukihiro Kawamoto, Tokyo (JP)

(73) Assignee: Hirata Corporation, Tokyo (JP)

( * ) Notice: Subject to any disclaimer, the term of this patent is extended or adjusted under 35 U.S.C. 154(b) by 424 days.

(21) Appl. No.: 13/000,124

(22) PCT Filed: Jun. 20, 2008

(86) PCT No.: PCT/JP2008/061306
§ 371 (c)(1),
(2), (4) Date: Jan. 4, 2011

(87) PCT Pub. No.: WO2009/153879
PCT Pub. Date: Dec. 23, 2009

(65) Prior Publication Data
US 2011/0088235 A1    Apr. 21, 2011

(51) Int. Cl.
*B23P 19/04*    (2006.01)
*B23P 11/00*    (2006.01)

(52) U.S. Cl.
USPC ....... 29/229; 29/255; 29/243.56; 29/243.523; 29/225; 29/238

(58) Field of Classification Search
USPC .............. 29/229, 225, 238, 243.53, 255, 271, 29/283.5, 243.523, 243.56
See application file for complete search history.

(56) References Cited

U.S. PATENT DOCUMENTS

| | | | |
|---|---|---|---|
| 6,507,985 B1 * | 1/2003 | Loughlin et al. | 29/229 |
| 2003/0009871 A1 * | 1/2003 | Ino | 29/229 |
| 2005/0132552 A1 * | 6/2005 | Greenhill | 29/229 |

FOREIGN PATENT DOCUMENTS

| | | |
|---|---|---|
| JP | 2-24028 | 1/1990 |
| JP | 5-18060 | 5/1993 |
| JP | 11-300647 | 11/1999 |
| JP | 2002-346855 | 12/2002 |

OTHER PUBLICATIONS

International Search Report issued Jul. 22, 2008 in International (PCT) Application No. PCT/JP2008/061306.

* cited by examiner

*Primary Examiner* — Lee D Wilson
*Assistant Examiner* — Seahee Yoon
(74) *Attorney, Agent, or Firm* — Wenderoth, Lind & Ponack, LLP

(57) ABSTRACT

A snap ring attachment includes a guide cylinder (40) defining a guide path (41) having a region of a supply port side of a snap ring exhibiting a circular section and a region of an exit side of the snap ring exhibiting an oval section and continuously varying from the circular section to the oval section, so as to guide the snap ring toward an attachment groove, a posture changing and pressing mechanism (50) provided in the guide cylinder for pressing the snap ring supplied in an upright state vertical to the extending direction of the guide path while being radially contracted, to tiltingly move it, then again erect it, and press it while changing its posture to be pushed into the attachment groove, and a driving mechanism (60) for exerting driving force to generate pressing force in the posture changing and pressing mechanism.

7 Claims, 13 Drawing Sheets

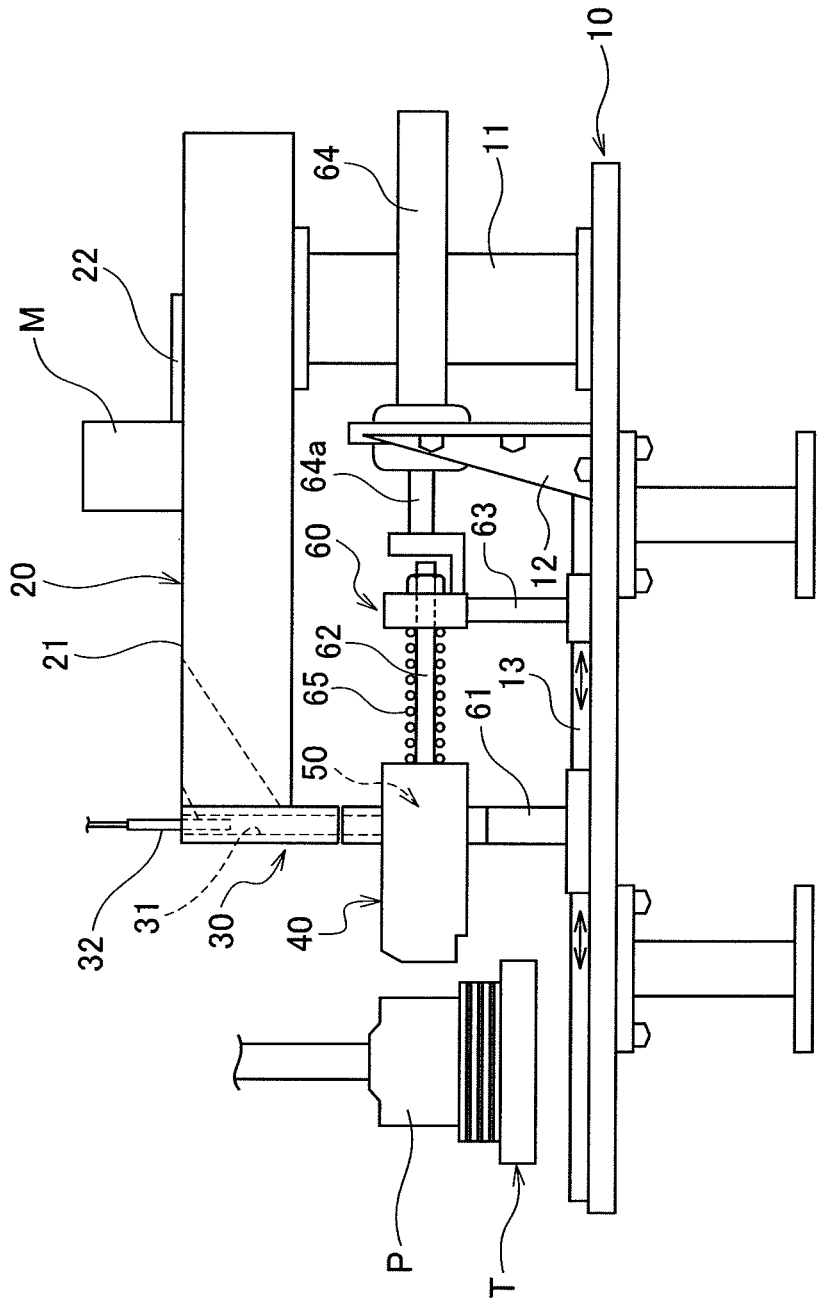

SNAP RING ATTACHMENT AND SNAP RING ATTACHING TOOL

TECHNICAL FIELD

The present invention relates to a snap ring attachment and a snap ring attaching tool that automatically attach a C-type snap ring having a gap to an attachment groove of a workpiece, and more particularly to a snap ring attachment and a snap ring attaching tool that attach a snap ring to an annular attachment groove formed at each of both ends of a pin hole into which a piston pin for coupling a connecting rod with a piston of an internal-combustion engine is inserted to prevent the piston pin from coming off.

BACKGROUND ART

As a conventional snap ring attachment, as shown in FIG. 1A to FIG. 1C, there is known a snap ring attachment including a guide cylinder 1 that defines a guide path 1a having a circular cross section to guide a snap ring SR while directly coming into contact with a piston P, a pushing member 2 having a discoid pressing portion 2a to push the snap ring SR contracted in a diametric direction and introduced in the guide cylinder 1 toward an attachment groove Pg, and others when attaching the snap ring SR to the attachment groove Pg of the piston P in a state that a piston pin Pi is inserted in a pin hole Ph of the piston P.

Further, when the snap ring SR is contracted in the diametric direction and supplied into the guide cylinder 1 as shown in FIG. 1A, a pushing rod 2 is moved in a state where the pressing portion 2a is in contact with the snap ring SR as shown in FIG. 1B, whereby the snap ring SR is attached to the attachment groove Pg as shown in FIG. 10.

Meanwhile, as the piston P which is an attachment target, various types of pistons are present in accordance with types of engines, and hence an end region of the guide cylinder 1 must be also formed into a shape associated with the piston P. In particular, in case of the piston P having a configuration that a distance between an annular groove Pcg to which the piston ring is attached and the attachment groove Pg is small, a notch portion 1b is provided in an end outer peripheral region of the guide cylinder 1 to adapt the guide cylinder 1 to the piston P.

However, when the notch portion 1b is provided to the guide cylinder 1 in this manner, a thickness of a wall that defines the guide path 1a is reduced, the snap ring SR (an edge of a gap in particular) that slides on the guide path 1a to move may possibly abrade a wall surface to break the guide cylinder 1.

As another snap ring attachment, there is known a snap ring attachment including a guide cylinder that defines a guide path having a circular cross section tapered into a conical shape on an end side so as to guide a supplied snap ring to an attachment groove of a piston while pressing the snap ring and contracting the snap ring in a diametric direction, a pushing member that is inserted into the guide cylinder to allow its reciprocating and rotating motions and has an inclined surface for pressing the snap ring and a cylindrical protruding portion configured so as to be inserted into a through hole of a piston pin, and others, wherein the snap ring attachment has a configuration that the pushing member is pushed in to move the inclined snap ring while contracting the snap ring in the diametric direction, and the pushing member is rotated when a part of the snap ring reaches the attachment groove, whereby the entire snap ring is attached to the attachment groove (see, e.g., Patent Document 1).

However, in this attachment, an operator manually performs all of an operation of supplying the snap ring into the guide cylinder, a pushing operation, a radially contracting operation, and an attaching operation based on rotation, and the attaching operation is not automatically carried out. On the other hand, when driving this pushing member by, e.g., an actuator to achieve automation in this attachment, a reciprocation driving actuator configured to push in the pushing member and a rotation driving actuator configured to rotate the pushing member are required, thereby resulting in a complicated configuration.

Further, still another snap ring attachment, there in known a snap ring attachment including an outer sleeve that comes into contact with one end side of a pin hole of piston in a state that a snap ring is inserted therein and horizontally held, an inner sleeve that is slidably provided in the outer sleeve to press the snap ring, an insertion rod that is inserted into the pin hole from the other end side of the pin hole of the piston and has an end surface for erecting and positioning the snap ring held in the outer sleeve, and others, wherein the inner sleeve and the insertion rod abut on each other from both sides, the snap ring is held and moved in an upright state by an end surface of the inner sleeve and the end surface of the insertion rod, and the snap ring is attached to an attachment groove of the piston (see, e.g., Patent Document 2).

However, in this attachment, since the snap ring is attached to one of the attachment grooves alone in a state that the piston pin is not inserted in the pin hole of the piston, the snap ring cannot be attached to the other attachment groove after insertion of the piston pin. Furthermore, in order to attach one snap ring, the outer sleeve in which the inner sleeve is accommodated and the insertion rod must be arranged on both sides between where the piston is located, thereby leading to an increase in size of the attachment.

Patent Document 1: Japanese Utility Model KOKOKU Publication No. 05-18060
Patent Document 2: Japanese Unexamined Patent Publication No. 02-24028

DISCLOSURE OF INVENTION

Problem to be Solved by the Invention

In view of the above-described problem, it is an object of the present invention to provide a snap ring attachment and a snap ring attaching tool that can improve durability of components constituting the attachment and enable stable and assured attachment while achieving simplification of a construction, miniaturization, labor saving, automatization of an attachment operation, simplification of an attachment step, and others.

Means for Solving Problem

To achieve the above-described object, there is provided a snap ring attachment according to the present invention that attaches a C-type snap ring having a gap to an attachment groove of a workpiece, and that includes: a guide cylinder that defines a guide path having a region of a supply port side, to which the snap ring is supplied, having a circular cross section and a region of an exit side, from which the snap ring is pushed out, having an elliptic cross section, and the circular cross section continuously varying to the elliptic cross section, in order to guide the snap ring toward the attachment groove; a posture changing and pressing mechanism arranged in the guide cylinder so as to press the snap ring supplied in an upright state vertical to an extending direction of the guide path while being radially contracted, move while inclining the snap ring, then again erect the snap ring, and press the snap ring while changing a posture of the snap ring to be pushed into the attachment groove; and a driving mechanism that exerts driving force to generate pressing force in the posture changing and pressing mechanism.

According to this configuration, when the snap ring is supplied while being radially contracted in the upright state (the state vertical to the extending direction of the guide path) in the guide cylinder, the posture changing and pressing mechanism is driven by the driving mechanism, and the snap ring is pressed in the guide path, caused to change its posture from the upright state to the inclined state to be moved, caused to again change its posture to the upright state near the attachment groove of the workpiece, and attached to the attachment groove. In particular, since the guide path is formed in such a manner that its cross section changes from the circular shape to the elliptic shape in a region of the supply port side to the exit side for the snap ring, advancing a pressing and oscillating ring toward the exit side enables easily shifting the pressing and oscillating ring that presses the snap ring to an inclined state from an upright state.

As described above, when the snap ring is moved, since the posture of the snap ring is temporarily changed to the inclined state, the whole circumference of the snap ring can be prevented from sliding on the inner peripheral surface of the guide path, breakage and others of the guide path due to abrasion can be avoided, and the snap ring can be smoothly moved because the frictional force can be reduced.

Moreover, since the posture changing and pressing mechanism that is arranged in the guide cylinder so as to continuously change the posture of the snap ring to the upright state, the inclined state, and the upright state in the mentioned order is adopted, the snap ring can be assuredly attached to the attachment groove of the workpiece while achieving simplification of the construction.

That is, durability of the components constituting the attachment can be improved while achieving simplification of the construction, miniaturization, labor saving, automatization of the attachment operation, simplification of the attachment step, and others, and the snap ring can be stably and assuredly attached to the attachment groove.

In the above-described configured attachment, it is possible to adopt a configuration that the posture changing and pressing mechanism includes a movable rod reciprocable in the guide cylinder, a pressing and oscillating ring that is coupled with the movable rod so as to allow its oscillating motion on an oscillation axis line vertical to an extending direction of the guide cylinder and is configured to press the snap ring, and a restricting portion provided to the movable rod to regulate the pressing and oscillating ring to the upright state vertical to the extending direction of the guide cylinder and a predetermined inclined state.

According to this configuration, when the movable rod advances in the guide cylinder (the guide path) toward the attachment groove together with the pressing and oscillating ring and the regulating portion, a part of the pressing and oscillating ring capable of oscillating in the angular range regulated by the regulating portion comes into contact with the snap ring in the upright state, the entire pressing and oscillating ring comes into contact with the snap ring in accordance with the forward movement of the movable rod, and the pressing and oscillating ring is inclined by frictional force (a rotational moment) exerting on the snap ring and held at a predetermined inclined position by the regulating portion, whereby the posture of the snap ring is changed to a state inclined at a predetermined angle. Additionally, when the movable rod moves forward, and a part of the snap ring (an end portion in the moving direction) reaches the attachment groove and then the movable rod further moves forward, the movement of a part (an end portion in the moving direction) of the pressing and oscillating ring is regulated, the pressing and oscillating ring thereby rotates to erect, and the posture of the snap ring is changed to the upright state in accordance with this rotation of the pressing and oscillating ring, whereby the entire snap ring is attached to the attachment groove.

Since the movable rod, the pressing and oscillating ring that moves in the guide cylinder integrally with the movable rod, and the regulating portion are adopted as the posture changing and pressing mechanism, the posture of the snap ring can be smoothly and assuredly changed while achieving simplification of the construction, miniaturization, a reduction in cost, and others.

In the above-described configured attachment, it is possible to adopt a configuration that the oscillation axis line of the pressing and oscillating ring is always placed at a position offset from a central axis line of the guide path when the movable rod reciprocates in the guide cylinder.

According to this configuration, since the oscillation axis line of the pressing and oscillating ring is offset from the central axis line of the guide path, a large moment is apt to be applied to an outer edge portion on a side where a length from the oscillation axis line to an inner wall of the guide path is large, and the pressing and oscillating ring can be easily inclined so as to move the outer edge portion backward in the moving direction, whereby the posture of the snap ring can be changed to a state that it is always inclined in a predetermined direction.

In the above-described configured attachment, it is possible to adopt a configuration that the movable rod has a protruding portion that penetrates and extends through the pressing and oscillating ring.

According to this configuration, since the protruding portion can be inserted into the snap ring, the snap ring can be prevented from being moved apart and displaced from the pressing and oscillating ring, the positioning of the workpiece and the movable rod can be performed by inserting the protruding portion into the through hole provided on the workpiece side, and hence the snap ring can be highly accurately attached to the attachment groove.

In the above-described configured attachment, it is possible to adopt a configuration that the movable rod has a two-surface portion that defines planes parallel to each other, and the pressing and oscillating ring has substantially rectangular opening portion into which the two-surface portion is inserted to allow its oscillating motion on an oscillation axis line vertical to the two-surface portion.

According to this configuration, since the pressing and oscillating ring is formed to have the substantially rectangular opening portion but not a circular opening portion, an area of a part that comes into contact with the snap ring increases, thereby assuredly pressing the snap ring.

To achieve the above-described object, there is provided a snap ring attaching tool according to the present invention that defines a guide path through which a C-type snap ring having a gap is guided toward an attachment groove of a workpiece, wherein the guide path is formed to have a region of a supply port side, to which the snap ring is supplied, having a circular cross section and a region of an exit side, from which the snap ring is pushed out, having an elliptic cross section, and the circular cross section continuously varying to the elliptic cross section, in order to accept a posture changing and pressing mechanism that presses the snap ring supplied in an upright state vertical to an extending direction of the guide path while being radially contracted, moves while inclining the snap ring, then again erects the snap ring, and presses the snap ring while changing a posture of the snap ring to be pushed into the attachment groove.

According to this configuration, at the time of attaching the snap ring to the attachment groove of the workpiece, when the snap ring is pressed by the posture changing and pressing mechanism by using this tool, the posture of the snap ring can be changed from the upright state to the inclined state, again changed to the upright state, and guided toward the attachment groove. As a result, the snap ring can be easily and assuredly attached to the attachment groove of the workpiece.

In the above-described configured tool, it is possible to adopt a configuration that the guide path is formed in such a manner that a center of the circular cross section is placed on a central axis line of the guide path and a center of the elliptic cross section is offset from the center of the circular cross section.

According to this configuration, the posture of the snap ring can be smoothly changed (the upright state→the inclined state→the upright state), and the snap ring can be guided toward the attachment groove.

Advantageous Effect of the Invention

According to the snap ring attachment and tool having the above-described configuration, durability of the components constituting the attachment can be improved while achieving simplification of the construction, miniaturization, automatization of the attachment operation, simplification of the attachment step, and others, whereby the snap ring can be stably and assuredly attached to the attachment groove.

BRIEF DESCRIPTION OF DRAWINGS

FIG. 2 is a side view showing an embodiment of a snap ring attachment according to the present invention.

EXPLANATIONS OF LETTERS OR NUMERALS

Figure 1A:
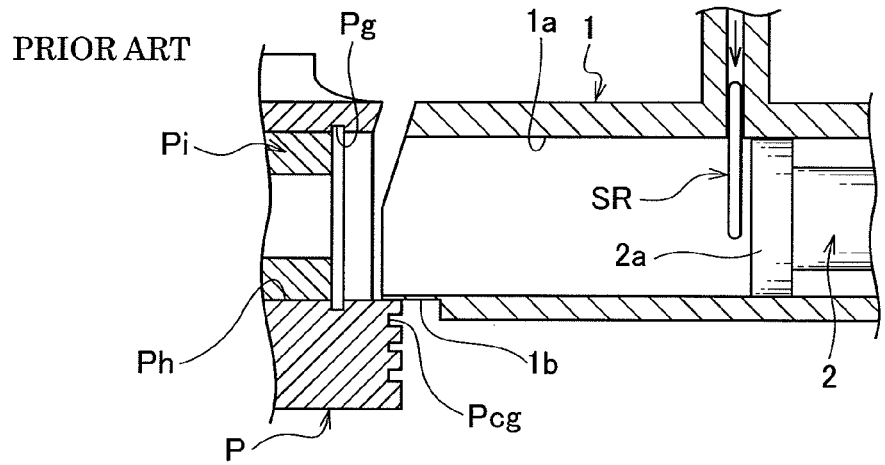
FIG. 1A is a partial cross-sectional view showing a part of a conventional snap ring attachment.
Figure 1B:
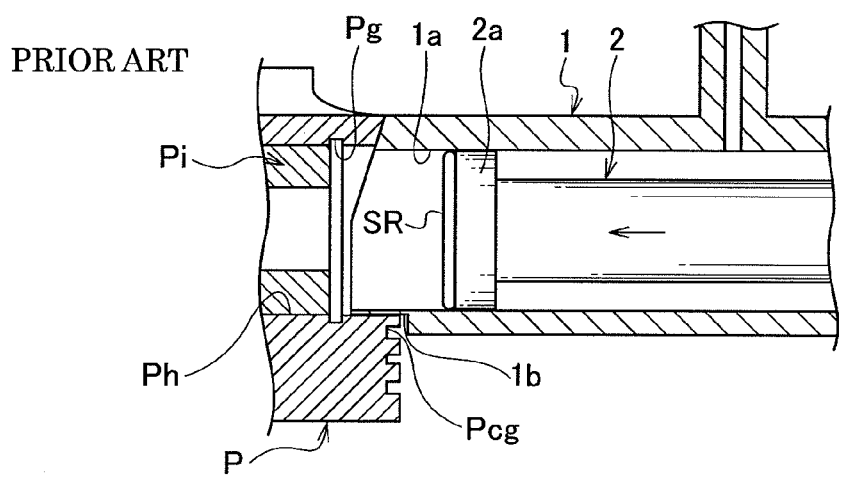
FIG. 1B is a partial cross-sectional view showing the part of the conventional snap ring attachment.
Figure 1C:
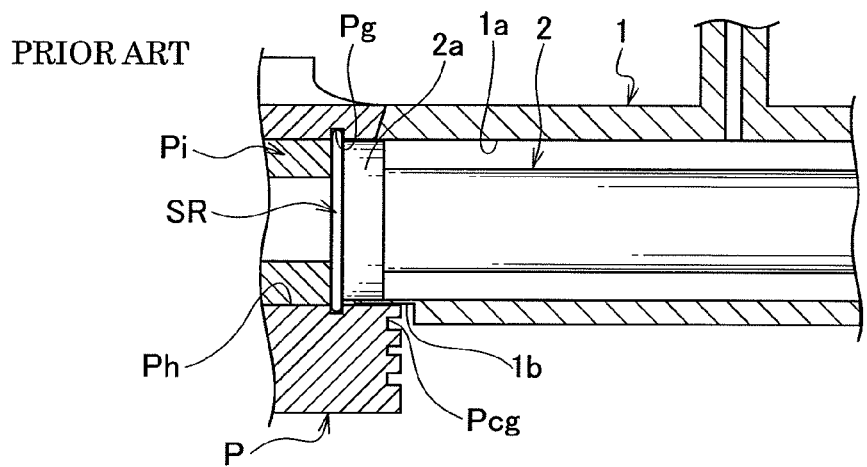
FIG. 1C is a partial cross-sectional view showing the part of the conventional snap ring attachment.

SR snap ring
SR1 gap
P piston (workpiece)
Pi piston pin
Pih through hole
Ph pin hole
Pg attachment groove
Pcg annular groove
10 base
11, 12 leg portion
13 guide rail
20 supply mechanism
21 supply path
22 push-out member
30 radial contraction mechanism
31 radial contraction guide path
32 guide member
33 pressing plate
40 guide cylinder
41 guide path
L1 central axis line of the guide path
41$a$ circular cross section
41$b$ elliptic cross section
42 supply port
43 exit
44 end portion
45 notch portion
46 rear end portion
50 posture changing and pressing mechanism
51 movable rod
L central axis line of the movable rod
52 pressing and oscillating ring
52$a$ oscillation shaft
L2 oscillation axis line
52$b$ opening portion
52$c$ pressing surface
52$d$, 52$e$ outer edge inclined portion
52$f$ rear end surface
53 regulating portion
53$a$ upright surface
53$b$ inclined surface
54 protruding portion
54$a$ two-surface portion
54$b$ arc surface
60 driving mechanism
61 slider
62 driving rod
63 slider
64 actuator
65 compression spring
40' movable cylinder
41' guide path
400 snap ring attaching tool
401 guide path
401$a$ circular cross section
401$b$ elliptic cross section
402 supply port 403 exit
404 end portion
405 notch portion

BEST MODE(S) FOR CARRYING OUT THE INVENTION

An embodiment according to the present invention will now be described hereinafter with reference to the accompanying drawings.

As shown in FIG. 2, this snap ring attachment includes a base 10, a supply mechanism 20 that is provided on the base 10 and supplies a snap ring SR, a radial contraction mechanism 30 that radially contracts the snap ring SR, a guide cylinder 40 that is separably engaged with a piston P as a workpiece and guides the snap ring SR toward an attachment groove Pg of the piston P, a posture changing and pressing mechanism 50 that presses the snap ring SR to change a posture of the snap ring and presses the snap ring into the attachment groove Pg, a driving mechanism 60 that is provided on the base 10 and exercises driving force to generate pressing force in the posture changing and pressing mechanism 50.

It is to be noted that, in an upper region of the base 10, the piston P as the workpiece is held by a holder table T to be sequentially carried in and sequentially carried out upon completion of attachment of the snap ring SR.

As shown in FIG. 2, the base 10 includes a leg portion 11 that supports the supply mechanism 20, a leg portion 12 that supports an actuator 64 included in the driving mechanism 60, a guide rail 13 that reciprocably guides a slider 61 supporting the guide cylinder 40 and a slider 63 supporting a driving rod 62, and others.

As shown in FIG. 2, the supply mechanism 20 is fixed to an upper side of the base 10 through the leg portion 11 and includes a supply path 21 through which the snap rings SR are supplied, a push-out member 22 that pushes out the snap rings SR one by one onto the supply path 21 from a magazine M loaded with the plurality of snap ring SR in a vertical direction, and others.

The supply path 21 is formed to direct a gap SR1 (see FIG. 6) of the snap ring SR toward a lower side in an end portion region thereof which shifts from the supply path 21 to the radial contraction mechanism 30.

Figure 6:
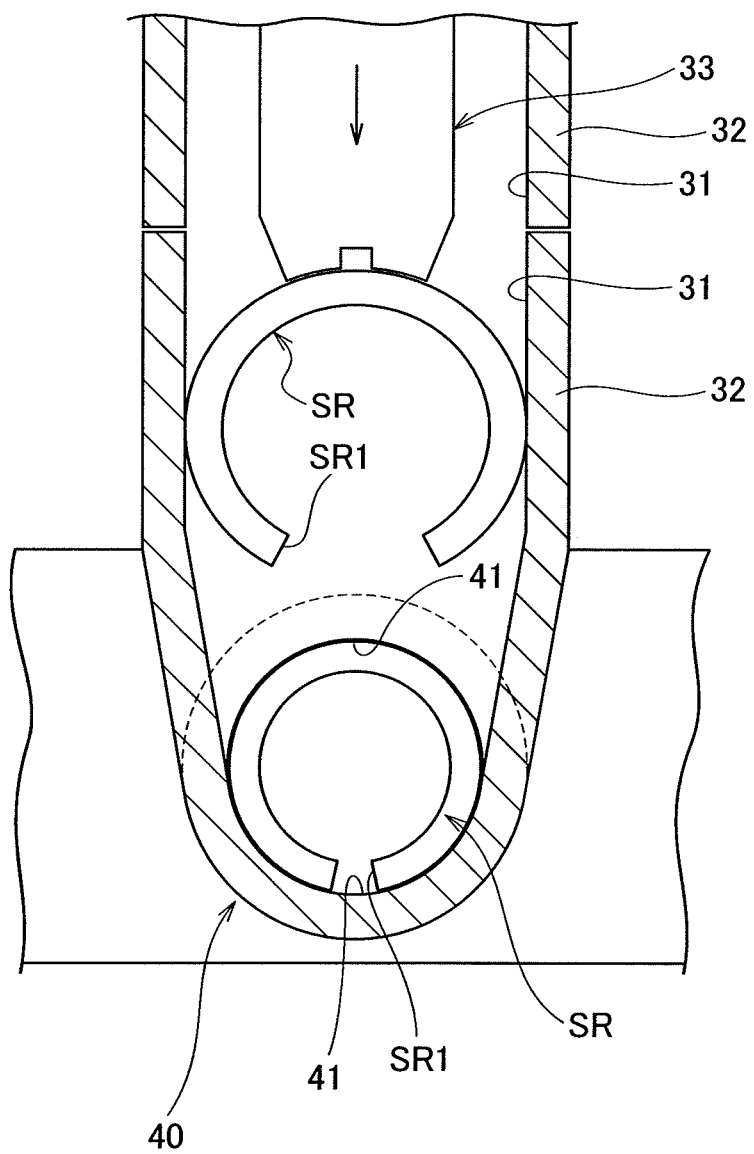
FIG. 6 is a partial cross-sectional view showing a part of the attachment depicted in FIG. 2.

As shown in FIG. 2 and FIG. 6, the radial contraction mechanism 30 includes a radial contraction guide path 31 that guides the snap ring SR having the downwardly directed gap SR1 toward the lower side while accepting the snap ring SR and radially contracting the snap ring SR, a guide member 32 that defines the radial contraction guide path 31, a pressing plate 33 that presses from above the snap ring supplied to the inside of the radial contraction guide path and moves the snap ring SR downwards, a driving mechanism (not shown) that drives the pressing plate 33 to moves up and down, and others.

Here, as shown in FIG. 2, the guide member 32 is cut at a middle point, and its upper region is fixed to the supply mechanism 20 while its lower region is fixed to the guide cylinder 40.

Figure 3:
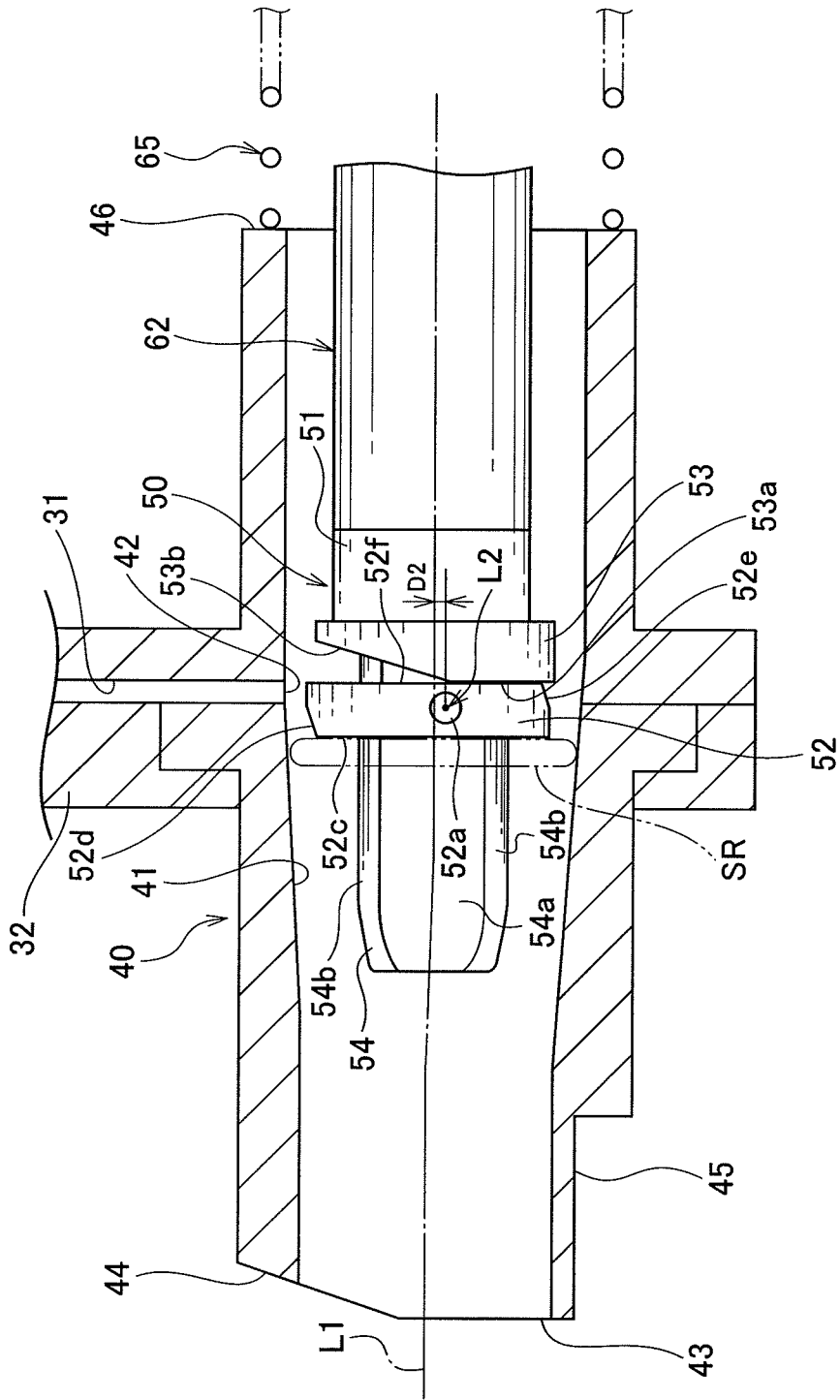
FIG. 3 is a partial cross-sectional view showing a part of the attachment depicted in FIG. 2.
Figure 4:
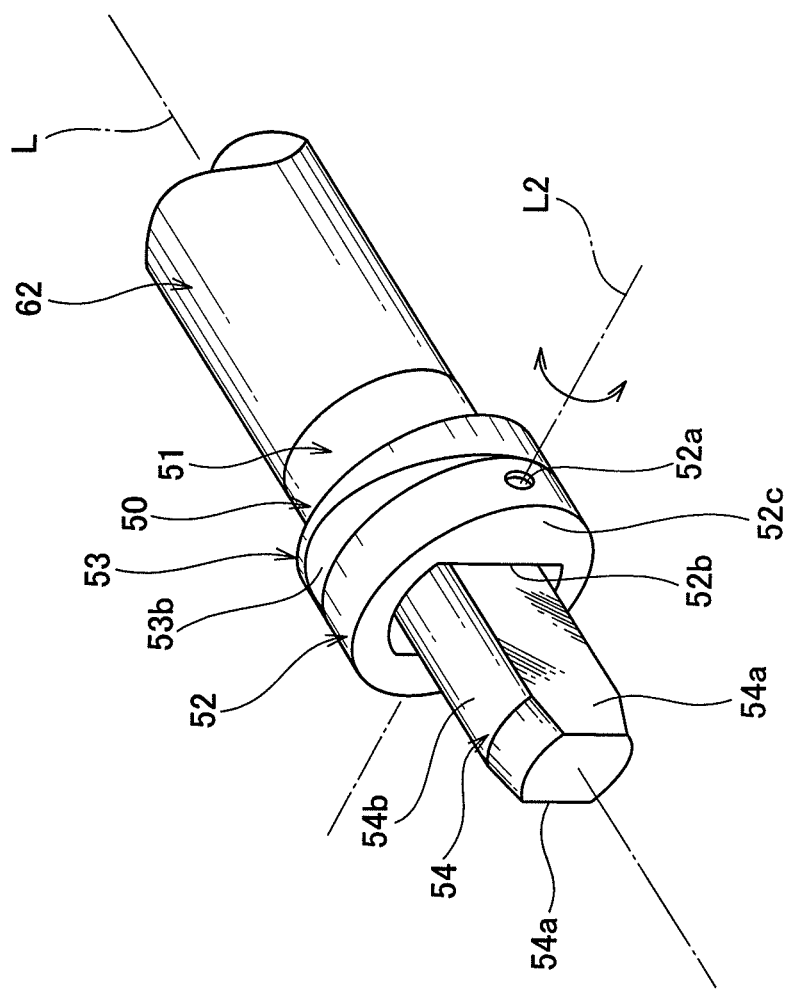
FIG. 4 is a partial perspective view showing a part of the attachment depicted in FIG. 2.

As shown in FIG. 3 and FIG. 4, the guide cylinder 40 includes a guide path 41 having a central axis line L1 so as to guide the snap ring SR toward the attachment groove Pg of the piston P, a supply port 42 through which the snap ring SR is supplied while being radially contracted in an upright state vertical to an extending direction (a direction of the central axis line L1), an exit 43 that is defined at an end of the guide path 41 and from which the snap ring SR is pushed out, an end portion 44 that comes into contact with the piston P, a notch portion 45 formed to avoid interference with the piston in a state that the guide cylinder is in contact with the piston P, a rear end portion 46 with which one end portion of a compression spring 65 included in the driving mechanism 60 comes into contact, and others.

Figure 7:
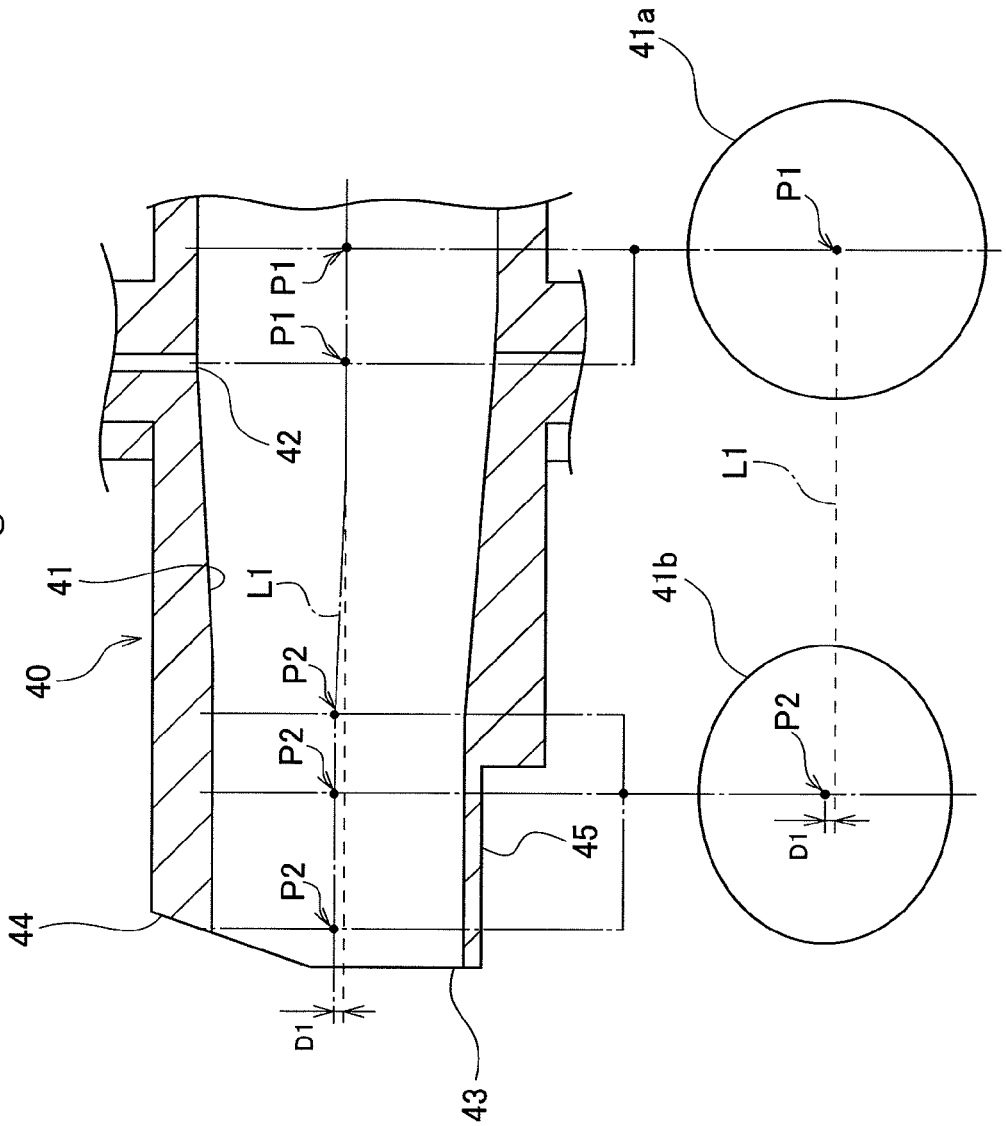
FIG. 7 is a cross-sectional view showing a guide cylinder (a guide path) included in the attachment depicted in FIG. 2.

As shown in FIG. 7, the guide path 41 is formed in such a manner that a region of the supply port 41 side to which the snap ring SR is supplied has a circular cross section 41a, a region of the exit 43 side from which the snap ring SR is pushed out has an elliptic cross section 41b, and a center P2 of the elliptic cross section 41b is offset from a center P1 of the circular cross section 41a to a side distanced from the notch portion 45 by a distance D1 Further, it is formed in such a manner that an intermediate region of the guide path 41 continuously and smoothly changes from the circular cross section 41a to the elliptic cross section 41b, i.e., that the central axis line L1 is not straight but is inclined and smoothly changed in the intermediate region to connect the center P1 with the center P2.

The notch portion 45 is formed to notch an end outer peripheral region of the guide cylinder 40 in a region where the guide path 41 is formed with the elliptic cross section 41b.

That is, as shown in FIG. 7, since the elliptic cross section 41b is formed to be offset toward the upper side by the distance D1 with respect to the circular cross section 41a, a wall thickness of a region of the notch portion 45 can be formed to be larger than that in a conventional example, and mechanical strength can be increased, whereby durability against, e.g., sliding abrasion can be improved.

Figure 5:
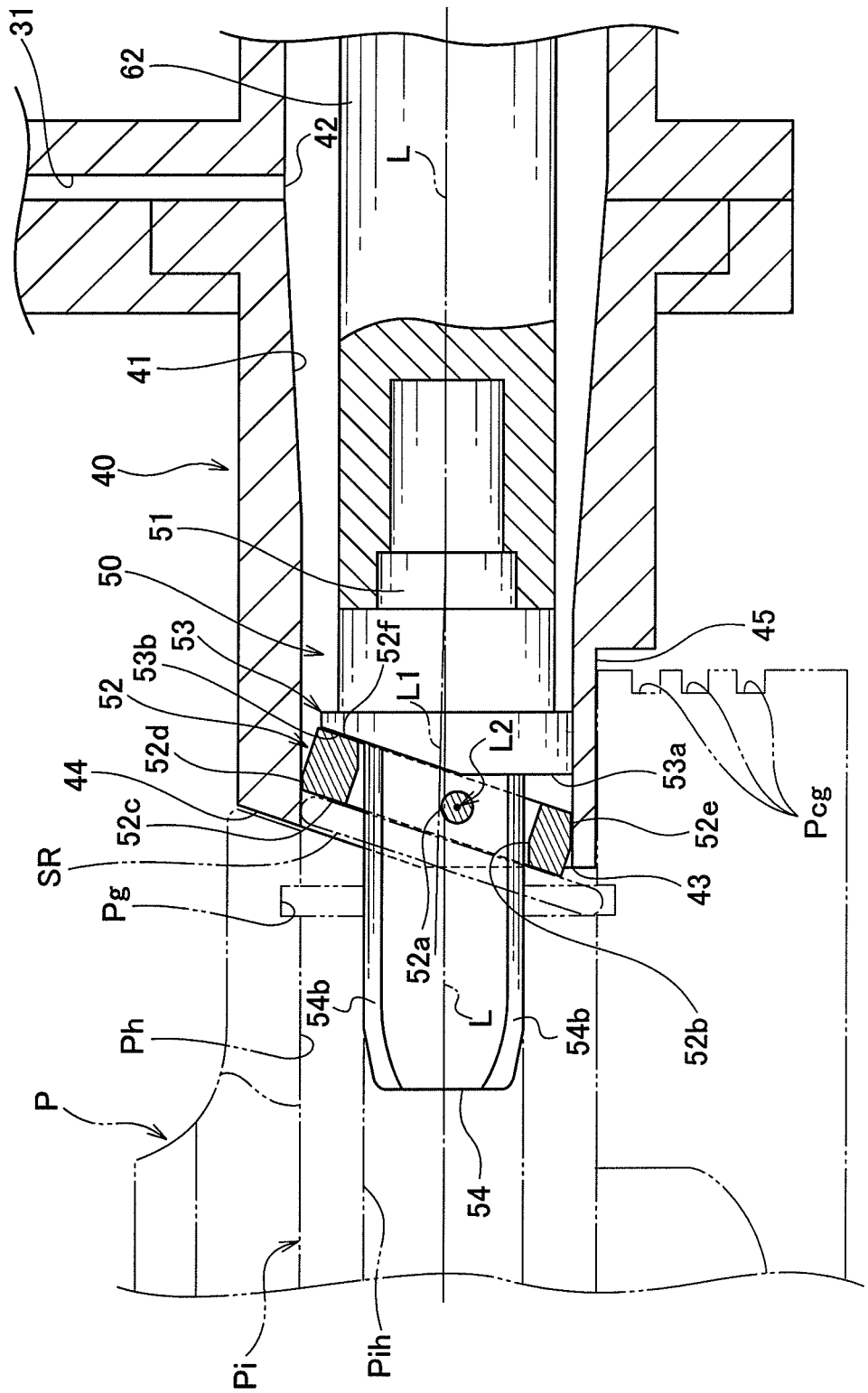
FIG. 5 is a partial cross-sectional view showing a part of the attachment depicted in FIG. 2 and a workpiece.

As shown in FIG. 3 to FIG. 5, the posture changing and pressing mechanism 50 includes a movable rod 51 arranged in the guide cylinder 40 (the guide path 41) to allow its reciprocating motion, a pressing and oscillating ring 52 that is coupled with the movable rod 51 to allow its oscillating motion on an oscillation axis line L2 vertical to an extending direction (a direction of the central axis line L1) of the guide path 41 and is capable of pressing the snap ring SR, a regulating portion 53 that is provided to the movable rod 51 to regulate the pressing and oscillating ring 52 to an upright state vertical to the extending direction (the direction of the central axis line L1 in a region of the supply port 42) of the guide path 41 and a predetermined inclined state, a protruding portion 54 that penetrates and extends through the pressing and oscillating ring 52 and others.

As shown in FIG. 5, the movable rod 51 has a central axis line L that coincides with a central axis line of a through hole Pih of the piston P, and the movable rod is formed to be detachably fitted in and coupled with a driving rod 62 of the driving mechanism 60.

Since the movable rod 51 is configured to be attached to/detached from the driving rod 62 in this manner, the posture changing and pressing mechanism 50 (the movable rod 51, the pressing and oscillating ring 52, and others) can be appropriately changed in accordance with types of the piston P (the workpiece) and the snap ring SR.

As shown in FIG. 3 to FIG. 5, the pressing and oscillating ring 52 is oscillatably supported on an oscillation shaft 52a that is implanted in the movable rod and defines the oscillation axis line L2, and the pressing and oscillating ring includes a substantially rectangular opening portion 52b into which the protruding portion 54 of the movable rod 51 is inserted, a pressing surface 52c that presses the snap ring SR, an outer edge inclined portion 52d formed in an upper front outer peripheral region, an outer edge inclined portion 52e formed in a lower rear outer peripheral region, a rear end surface 52f, and others.

Figure 8:
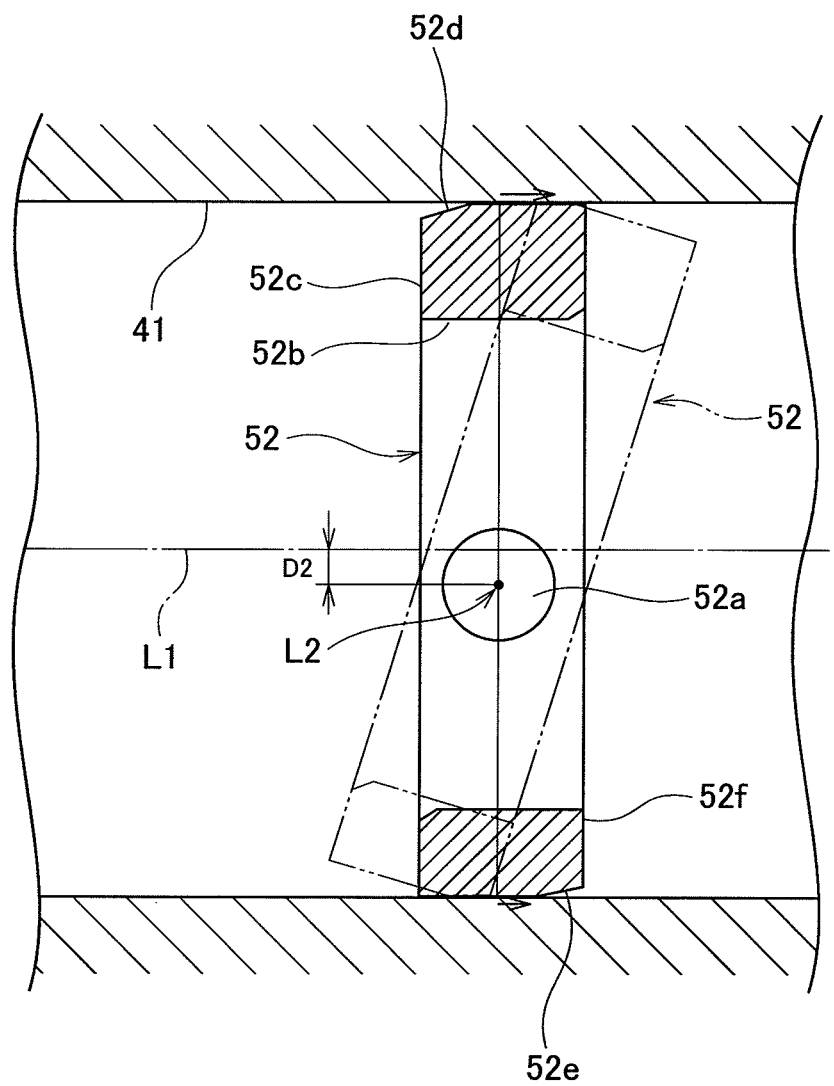
FIG. 8 is a partial cross-sectional view showing a pressing and oscillating ring included in the attachment depicted in FIG. 2.

As shown in FIG. 3, FIG. 5, and FIG. 8, the oscillation shaft 52a (the oscillation axis line L2) is located at a position offset toward the lower side with respect to the central axis line L of the movable rod 51 by a predetermined distance, and is formed to be offset toward the lower side from the central axis line L1 of the guide path 41 by a distance D2. This offset amount (distance) D2 varies depending on a position of the movable rod 51 with respect to the guide path 41, and this offset amount is small on the supply port 42 side but is large on the exit 43 side.

Since the oscillation shaft 52a (the oscillation axis line L2) is offet toward the lower side from the central axis line L of the movable rod 51 in this manner, an overhang amount of the upper outer edge portion (the outer inclined portion 52d) is larger than an overhang amount of the lower outer edge portion (the outer inclined portion 52e) with respect to the oscillation axis line L2 as the center, a large moment (torque) can be obtained even though frictional force and the like applied to the upper outer edge are small, and hence the pressing and oscillating ring 52 can be readily inclined.

Further, since the oscillation shaft 52a (the oscillation axis line L2) is always placed at the position offset toward the lower side from the central axis line L1 of the guide cylinder 41, at the time the pressing and oscillating ring 52 slides on the inner surface of the guide path 41 and moves forward to the exit 43 side while pressing the snap ring SR, if the snap ring SR undergoes uniform frictional force due to sliding as shown in FIG. 5, a rotation moment produced by this frictional force is larger in the upper outer edge portion (the outer inclined portion 52d). As a result, the pressing and oscillating ring 52 can be easily inclined in such a manner that the upper outer edge portion (the outer edge inclined portion 52d) is inclined toward the rear side of the traveling direction, whereby the posture of the snap ring SR can be changed to a state that the snap ring SR is always inclined in a predetermined direction.

As shown in FIG. 4, the opening portion 52b is formed into a substantially rectangular shape so as to define planar inner wall surfaces parallel to a two surface portion Ma of the protruding portion 54 and arc inner wall surfaces parallel to arc surfaces 54b of the protruding portion 54.

The pressing surface 52c is formed into a planar shape so as to press the snap ring SR, and the opening portion 52b defined inside thereof has a substantially rectangular shape, whereby (as compared with a case where the opening portion 52b has a circular shape) an area of a portion that comes into contact with the snap ring SR can be increased, and the snap ring SR can be prevented from coming off and can be assuredly pressed.

As shown in FIG. 3, FIG. 5, and FIG. 8, the outer edge inclined portion 52d is formed inclined linearly or curvedly so as to eliminate an edge in the upper front outer peripheral region facing the exit 43 side of the guide path 41 in the outer peripheral surface of the pressing and oscillating ring 52.

As shown in FIG. 3, FIG. 5, and FIG. 8, the outer edge inclined portion 52e is formed inclined linearly or curvedly so as to eliminate an edge in the lower rear outer peripheral region facing the supply port 42 side (the rear side) of the guide path 41 in the outer peripheral surface of the pressing and oscillating ring 52.

Since the outer edge inclined portions 52d and 53e are provided in this manner, the posture of the pressing and oscillating ring 52 can be smoothly changed to the upright state and the inclined state in the mentioned order when the pressing and oscillating ring 52 moves forward in the guide path 41, and the posture of the pressing and oscillating ring 52 can be smoothly changed to the upright state when the snap ring SR comes into contact with the attachment groove Pg and the further forward movement of the pressing and oscillating ring 52 is regulated.

As shown in FIG. 3 and FIG. 5, the rear end surface 52f has a planar shape, and is formed so as to come into contact with an upright surface 53a or an inclined surface 53b of the regulating portion 53.

As shown in FIG. 3 to FIG. 5, the regulating portion 53 is formed integrally with the movable rod 51, and is formed to define the upright surface 53a vertical to the central axis line L (the central axis line L1 in the regions of the supply port 42 and the exit 43) and the inclined surface 53b inclined toward the rear side with respect to the upright surface 53a at a predetermined angle (e.g., approximately 17 degrees).

Additionally, the upright surface 53a is to separably come into contact with a lower region of the rear end surface 52f of the pressing and oscillating ring 52, and the inclined surface 53b is to separably come into contact with an upper region of the rear end surface 52f of the pressing and oscillating ring 52.

That is, the regulating portion 53 regulates the pressing and oscillating ring 52 to the upright state vertical to the extending direction (the direction of the central axis line L) when the upright surface 53a comes into contact with the rear end surface 52f, and the regulating portion regulates the pressing and oscillating ring 52 to the predetermined inclined state when the inclined surface 53b comes into contact with the rear end surface 52f.

As shown in FIG. 3 to FIG. 5, the protruding portion 54 includes the two-surface portion 54a that defines planes parallel to each other in the direction of the oscillation axis line L2 and the arc surfaces 54b that define upper and lower regions of the outer periphery.

Further, as shown in FIG. 5, the protruding portion 54 is formed to be inserted into the through hole Pih of a piston pin Pi in such a mane that its arc surfaces 54b closely come into contact with the through hole Pih.

Since the protruding portion 54 that penetrates and extends through the pressing and oscillating ring 52 is integrally provided with respect to the movable rod 51 in this manner, the protruding portion 54 can be inserted into the snap ring SR, the snap ring SR can be thereby prevented from being moved away and displaced from the pressing and oscillating ring 52, and the piston P and the movable rod 51 can be positioned by inserting the protruding portion 54 into the through hole Pih of the piston pin Pi, whereby the snap ring SR can be highly accurately attached to the attachment groove Pg.

An operation of the posture changing and pressing mechanism 50 will now be described.

When the movable rod 51 moves forward to the attachment groove Pg in the guide cylinder 40 (the guide path 41), a part of the pressing and oscillating ring 52 that can oscillate in an angular range regulated by the regulating portion 53 comes into contact with the snap ring SR in the upright state, and the entire pressing and oscillating ring 52 comes into contact with the snap ring SR upon the forward movement of the movable rod 51. When the movable rod 51 further moves forward, a moment applied to the upper region of the pressing and oscillating ring 52 above the oscillation axis line L2 becomes larger than a moment applied to the lower region of the same, and the pressing and oscillating ring 52 is inclined and held at a predetermined inclined position by the regulating portion 53, thus changing the posture of the snap ring SR to the state inclined at a predetermined angle.

Further, when a part of the snap ring SR (the end portion in the traveling direction) reaches the attachment groove Pg and the movable rod 51 moves forward, since the movement of the part of the pressing and oscillating ring (the end portion in the traveling direction) is regulated, the pressing and oscillating ring 52 rotates to erect, and the posture of the snap ring SR is changed to the upright state in accordance with the rotation of this pressing and oscillating ring 52, whereby the entire snap ring SR is attached to the attachment groove Pg.

Since the movable rod 51, the pressing and oscillating ring 52 coupled with the movable rod 51, the regulating portion 53 provided to the movable rod 51, and others are adopted as the posture changing and pressing mechanism 50 in this manner, the posture of the snap ring SR can be smoothly and assuredly changed while achieving simplification of the construction, miniaturization, a reduction in cost, and others.

As shown in FIG. 2, the driving mechanism 60 includes the slider 61 that supports the guide cylinder 40 to be capable of advancing and retreating with respect to the piston P, the driving rod 62 that reciprocates the movable rod 51, the slider 63 that supports the driving rod 62 to be capable of advancing and retreating, the actuator 64 that exerts driving force to the driving rod 62, the compression spring 65 having one end portion latched and held on (the rear end portion 46 of) the guide cylinder 40 and the other end portion latched and held on the driving rod 62 (i.e., the slider 63), and others.

As shown in FIG. 2, the slider 61 is formed to horizontally hold the guide cylinder 40 and reciprocate the guide cylinder 40 along the guide rail 13 in such a manner that the guide cylinder 40 can move forward (advance) to the piston P and move backward (retreat) from the piston P.

As shown in FIG. 2, the driving rod 62 is formed in such a manner that one end portion thereof is fixed to the slider 63 and the other end portion thereof is coupled with the movable rod 51 of the posture changing and pressing mechanism 50 to be held.

The slider 63 holds the driving rod 62 (and the movable rod 51) in such a manner that the central axis line L coincides with the central axis line L1 in the region of the supply port 42 of the guide path 41 and a central axis line of the through hole Pih of the piston P, and the slider is formed to reciprocate the driving rod 62 along the guide rail 13 while allowing forward movement to the piston P and backward movement in a direction apart from the piston P.

As shown in FIG. 2, the actuator 64 is fixed on the base 10 through the leg portion 12, and the actuator is formed to couple an extension rod 64a thereof with the slider 63 so that driving force can be exercised to the driving rod 62.

As shown in FIG. 2 and FIG. 3, the compression spring 65 is a coil-like spring arranged around the driving rod 62, and one end portion thereof is latched and held on the rear end portion 46 of the guide cylinder 40 while the other end portion thereof is latched and held on the slider 63 (i.e., the driving rod 62).

That is, the guide cylinder 40 first moves forward to come into contact with the piston P by urging force of the compression spring 65 when the driving rod 62 is driven to move forward by the actuator 64, and the movable rod 51 moves forward while compressing the compression spring 65 when the driving rod 62 is further driven to move forward, whereby the driving force for generating pressing force in the posture changing and pressing mechanism 50 is exercised such that the snap spring SR is attached to the attachment groove Pg while its posture being changed (changed to the upright state, the inclined state, and the upright state in the mentioned order). As described above, one actuator 64 can drive the guide cylinder 40 and the movable rod 51 at the same time, and can drive them relatively at a predetermined timing.

An operation of this snap ring attachment will now be described with reference to FIG. 9A to FIG. 11B.

The snap ring SR is first directed to a predetermined direction and carried by the supply mechanism 20 to be fed to the radial contraction mechanism 30.

Furthermore, the snap ring SR is contracted along the radial contraction guide path 31 to have a predetermined diameter while being pressed down by the pressing plate 33.

Figure 9A:
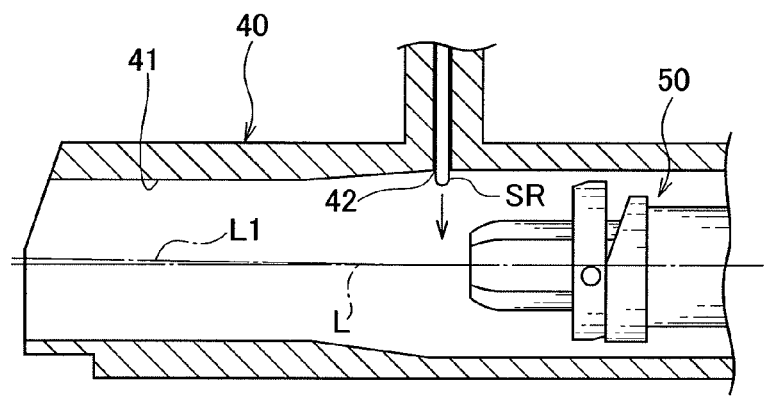
FIG. 9A is a partial cross-sectional view showing an attachment operation of the attachment depicted in FIG. 2.

Then, as shown in FIG. 9A, the snap ring SR is supplied from the supply port 42 in the guide cylinder 40 (the guide path 41) while being radially contracted in the upright state (the state vertical to the extending direction of the guide path 41 (the direction of the central axis line L1 in the region of the supply port 42)).

Figure 9B:
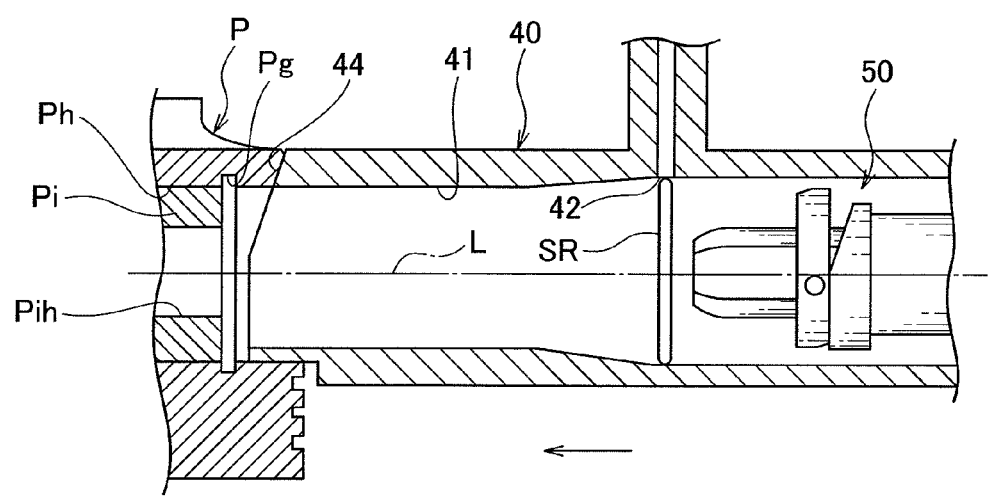
FIG. 9B is a partial cross-sectional view showing the attachment operation of the attachment depicted in FIG. 2.

Moreover, when the snap ring SR completely gains entrance into the guide path 41, the actuator 64 of the driving mechanism 60 is driven to move forward and brings the guide cylinder 40 into contact with the piston P as shown in FIG. 9B.

Subsequently, when the actuator 64 of the driving mechanism 60 is driven to further move forward, the movable rod 51 directly coupled with the driving rod 62 moves forward and (the pressing surface 52c of) the pressing and oscillating ring 52 of the posture changing and pressing mechanism 50 comes into contact with the snap ring SR to start a pressing operation.

Figure 10A:
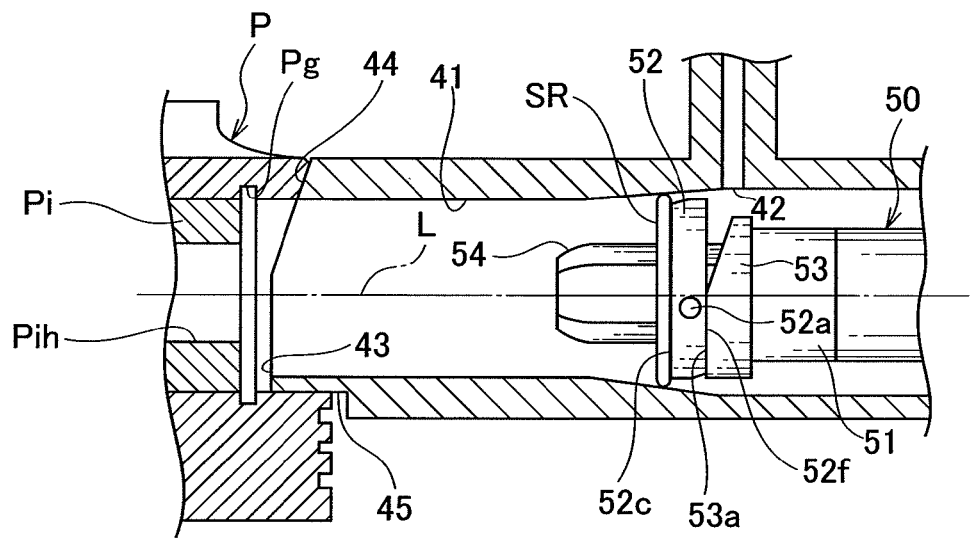
FIG. 10A is a partial cross-sectional view showing the attachment operation of the attachment depicted in FIG. 2.
Figure 10B:
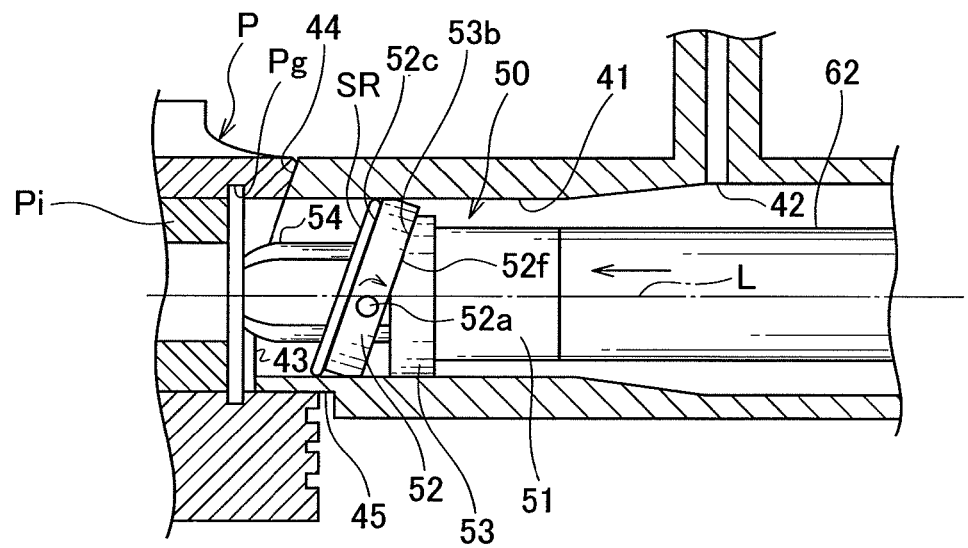
FIG. 10B is a partial cross-sectional view showing the attachment operation of the attachment depicted in FIG. 2.

Additionally, when the movable rod 51 (and the driving rod 62) further moves forward, as shown in FIG. 10B, the snap ring SR pressed by the pressing and oscillating ring of the posture changing and pressing mechanism 50 undergoes frictional force and others from the guide path 41, the pressing and oscillating ring 52 rotates on the oscillation axis line L2 to be inclined (the rear end surface 52f comes into contact with the inclined surface 53b) and held at a predetermined inclination angle by a moment generated by this frictional force, and the snap ring SR is pressed in the guide path 41, subjected to posture change to the inclined state from the upright state, and moved.

Figure 11A:
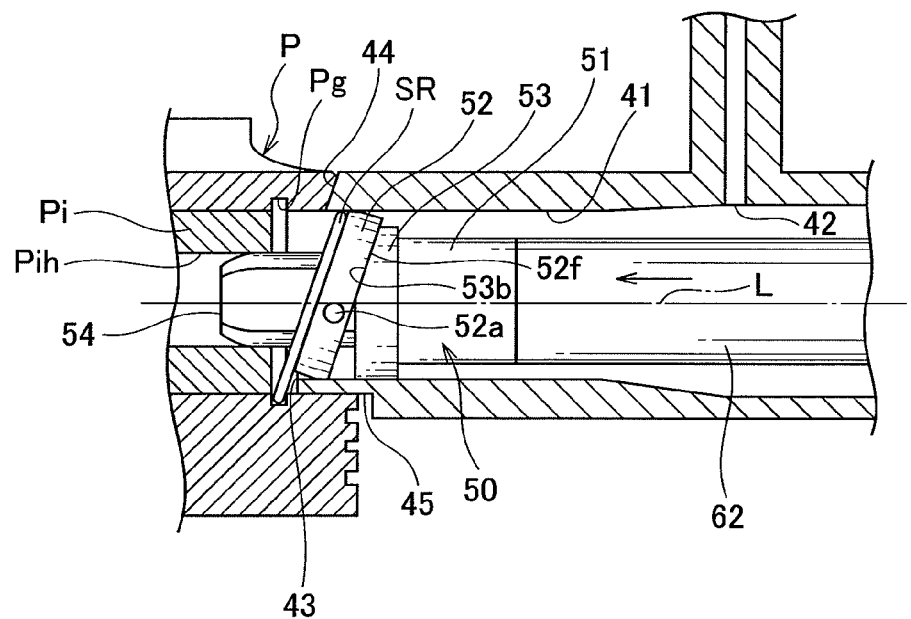
FIG. 11A is a partial cross-sectional view showing the attachment operation of the attachment depicted in FIG. 2.
Figure 11B:
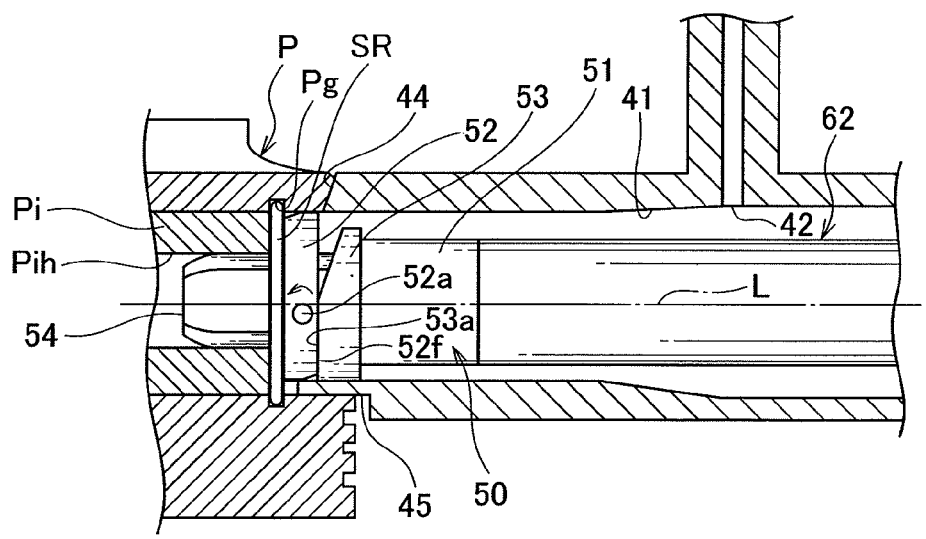
FIG. 11B is a partial cross-sectional view showing the attachment operation of the attachment depicted in FIG. 2.

When the actuator 64 of the driving mechanism 60 is further driven to move forward, as shown in FIG. 11A, the protruding portion 54 enters the through hole Pih of the piston pin Pi, and the lower region of the snap ring SR reaches the attachment groove Pg. At this point in time, the forward movement of the snap ring SR and the lower region of the pressing and oscillating ring 52 is regulated, the pressing and oscillating ring 52 is rotated from the inclined state to the upright state as shown in FIG. 11B upon further movement of the movable rod 51 (and the driving rod 62), and the snap ring SR is pressed to again change its posture to the upright state and attached to the attachment groove Pg.

When moving the snap ring SR in this manner, since its posture is temporarily changed to the inclined state, the whole circumference of the snap ring SR can be prevented from sliding on the inner peripheral surface of the guide path 41, breakage and others of the guide path 41 due to abrasion can be avoided, and the snap ring SR can be smoothly moved because frictional force can be reduced.

Furthermore, since the posture changing and pressing mechanism 50 arranged in the guide cylinder 40 is adopted to continuously change the posture of the snap ring SR to the upright state, the inclined state, and the upright state in the mentioned order, the snap ring SR can be assuredly attached to the attachment groove Pg of the piston P while achieving simplification of the construction.

That is, durability of components constituting the attachment can be improved and the snap ring SR can be stably and assuredly attached to the attachment groove Pg while achieving simplification of the construction, miniaturization, labor saving, automatization of the attachment operation, simplification of the attachment step, and others.

Figure 12:
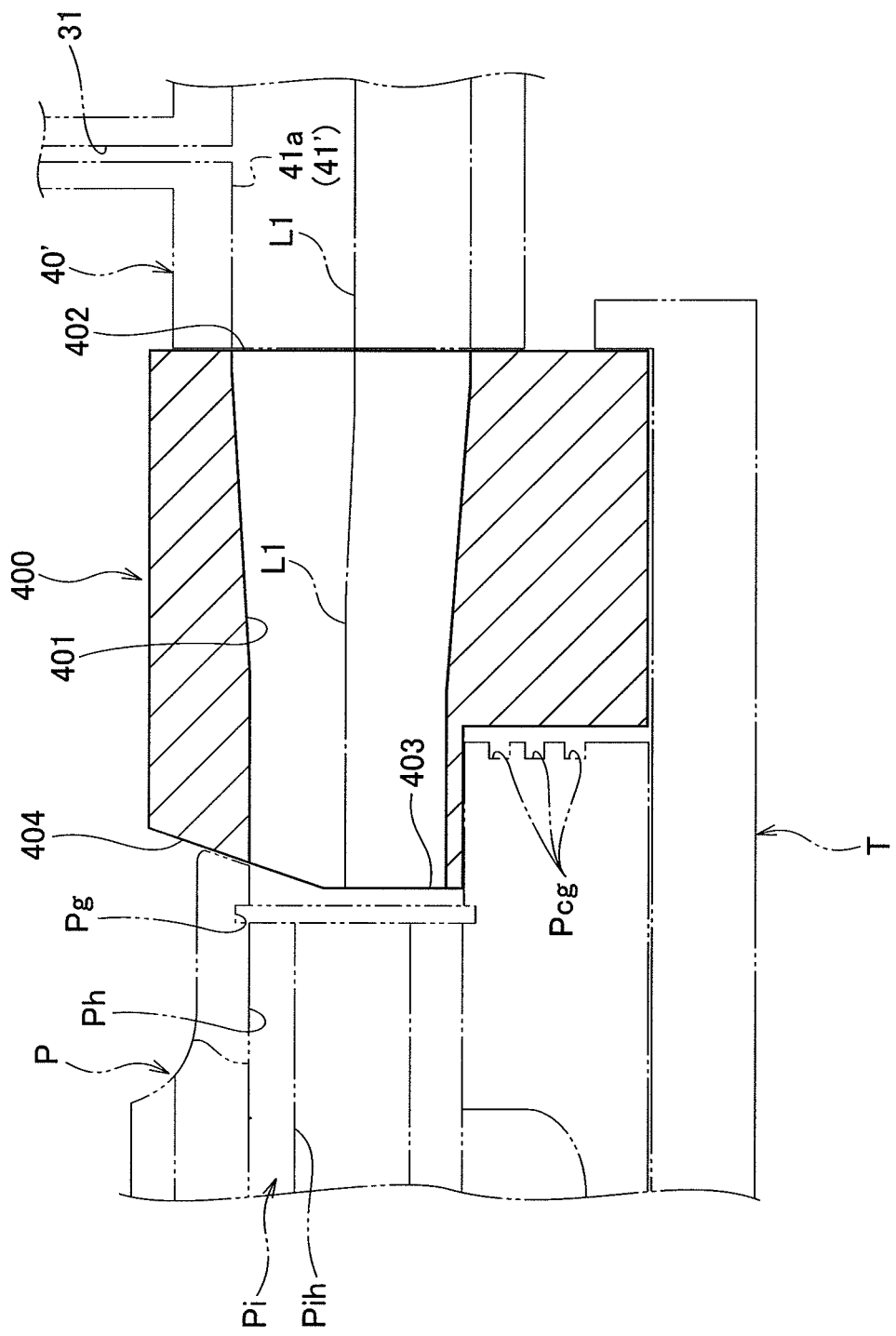
FIG. 12 is a cross-sectional view showing an embodiment of a snap ring attaching tool according to the present invention.
Figure 13:
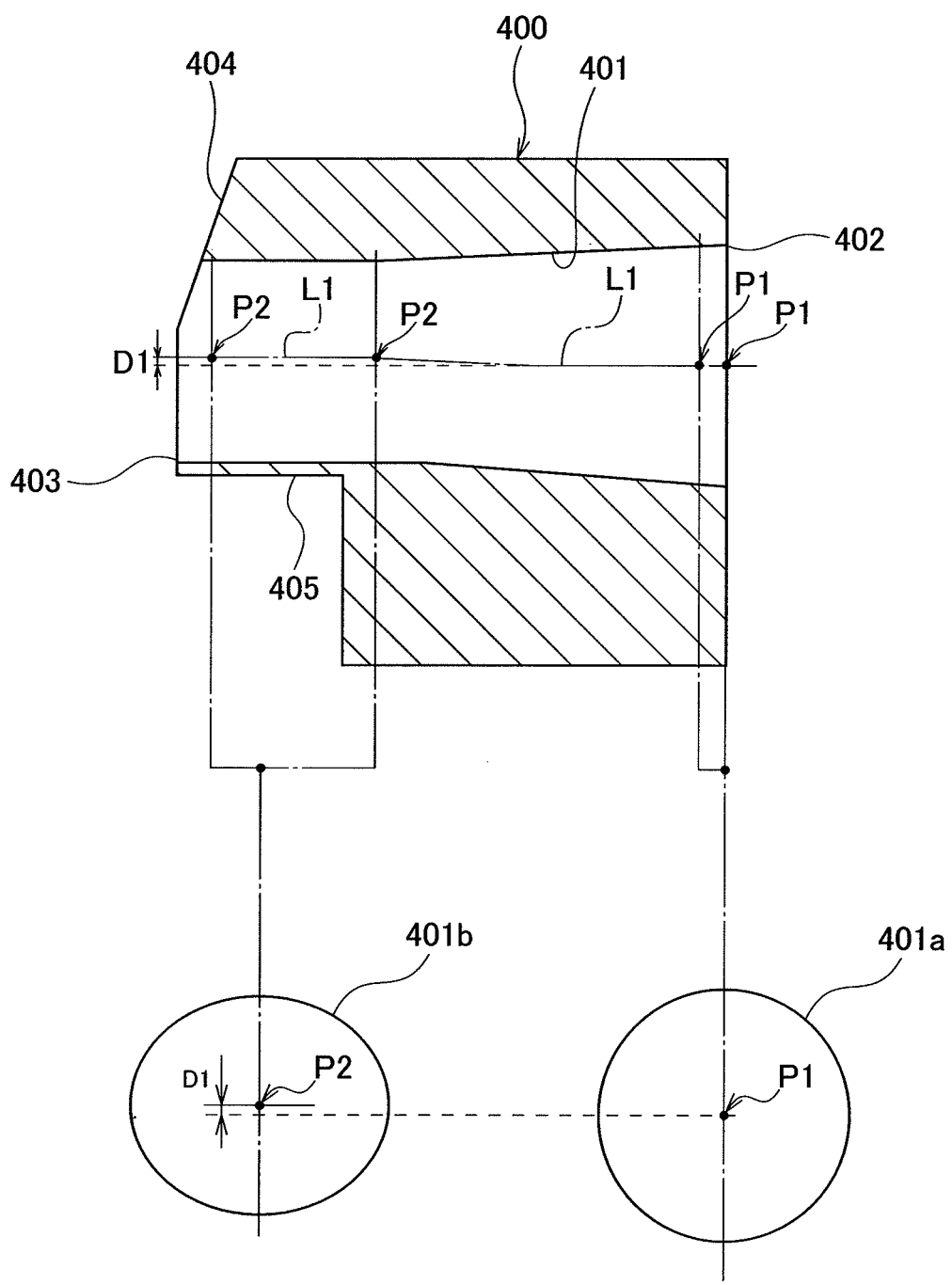
FIG. 13 is a cross-sectional view showing a guide path of the tool depicted in FIG. 12.

FIG. 12 and FIG. 13 show an embodiment of a snap ring attaching tool according to the present invention.

That is, as shown in FIG. 12, this snap ring attaching tool 400 includes a supply port 402 that comes into contact with a movable cylinder 40' that defines a guide path 41' having a circular cross section 41a, a guide path 401 along which a snap ring SR is guided toward an attachment groove Pg of a piston P, an exit 403 that is defined at an end of the guide path 401 and from which the snap ring SR is pushed out, an end portion 404 that is bought into contact with the piston P, a notch portion 405 formed to avoid interference with the piston P while being in contact with the piston P and others.

Here, the above-described posture changing and pressing mechanism 50 reciprocates in the guide path 41' of the movable cylinder 40' and the guide path 401 of the tool 400.

As shown in FIG. 13, in the guide path 401, a region of the supply port 402 side to which the snap ring SR is supplied is formed to have a circular cross section 401a, a region of the exit 403 side from which the snap ring SR is pushed out is formed to have an elliptic cross section 401b, and a center P2 of the elliptic cross section 401b is offset from a center P1 of the circular cross section 401a to a side distanced from the notch portion 405 by a distance D1.

Moreover, the guide path 401 is formed in such a manner that an intermediate region thereof can continuously and smoothly changes from the circular cross section 401a to the elliptic cross section 401b, i.e., that a central axis line L1 is not straight but changes smoothly while inclining in the intermediate region to connect the center P1 to the center P2.

That is, the guide path 401 is formed in such a manner that its region of the supply port 402 side to which the snap ring SR is supplied has the circular cross section 401a and its region of the exit 403 side from which the snap ring SR is pushed out has the elliptic cross section 401b in order to accept the above-described posture changing and pressing mechanism 50 that presses the snap ring SR supplied while being radially contracted in an upright state vertical to an extending direction (a direction of the central axis line L1 in the region on the supply port 402 side) of the guide path 401, moves while inclining the snap ring, then again erects the snap ring, and presses the snap ring while changing a posture of the snap ring SR to be pushed into the attachment groove Pg.

The notch portion 405 is formed in an end outer peripheral region of the tool 400 in a region where the guide path 401 is formed with the elliptic cross section 401b. That is, since the center P2 of the elliptic cross section 401b is offset from the center P1 of the circular cross section P1 to the side distanced from the notch portion 405, a wall thickness in the region of the notch portion 405 can be increased, mechanical strength can be enhanced, and durability against sliding abrasion and others can be improved.

Therefore, when attaching the snap ring SR to the attachment groove Pg of the piston P, the snap ring SR is pressed by the posture changing and pressing mechanism 50 with use of this tool 400, the posture of the snap ring SR is changed from the upright state to the inclined state and again changed to the upright state, whereby the snap ring SR can be guided toward the attachment groove Pg. As a result, the snap ring SR can be easily and assuredly attached to the attachment groove Pg of the piston P.

In the foregoing embodiment, the example adopting the posture changing and pressing mechanism 50 including the movable rod 51, the pressing and oscillating ring 52, the regulating portion 53, and the protruding portion 54 is adopted as a posture changing and pressing mechanism that presses the snap ring SR to be attached to the attachment groove Pg while changing the posture of the snap ring SR has been described, but the present invention is not limited thereto, and it is possible to adopt any other mechanism configured to be arranged in the guide cylinder 40 in order to press, incline, and again erect the snap ring SR supplied while being radially contracted in the upright state vertical to the extending direction of the guide path 41 and push the snap ring into the attachment groove Pg, namely, presses while changing a posture of the snap ring SR.

In the foregoing embodiment, although the example where the protruding portion 54 is integrally provided to the movable rod 51 of the posture changing and pressing mechanism 50 has been described, a configuration in which the protruding portion 54 is eliminated may be adopted.

In the foregoing embodiment, the example where the opening portion 52b of the pressing and oscillating ring 52 is formed into the substantially rectangular shape has been described, but the present invention is not limited thereto, and a circular opening portion may be adopted.

In the foregoing embodiment, the example where the movable rod 51 can be attached to/detached from the driving rod 62 has been described, but the present invention is not limited thereto, and the movable rod may be formed integrally with the driving rod.

In the foregoing embodiment, the piston P has been described as a workpiece to which the snap ring SR is attached, but the present invention is not limited thereto, and the present invention may be applied to any other workpiece as long as it has an attachment groove to which the snap ring SR is attached.

INDUSTRIAL APPLICABILITY

As described above, since the snap ring attachment and tool according to the present invention can improve the durability of the components constituting the attachment and stably and assuredly attach the snap ring to the attachment groove while achieving simplification of the construction, miniaturization, labor saving, automatization of the attachment operation, simplification of the attachment step, and others, these attachment and tool, are not restricted to the field concerning engine components, and they are useful in the fields of any other machine components as long as each of the components is a workpiece to which the snap ring must be attached.

The invention claimed is:

1. A snap ring attachment that attaches a C-type snap ring having a gap to an attachment groove of a workpiece, comprising:
   a guide cylinder that defines a guide path having a region of a supply port side, to which the snap ring is supplied, having a circular cross section and a region of an exit side, from which the snap ring is pushed out, having an elliptic cross section, the circular cross section continuously varying to the elliptic cross section, in order to guide the snap ring toward the attachment groove;
   a posture changing and pressing mechanism arranged in the guide cylinder so as to press the snap ring supplied in an upright state vertical to an extending direction of the guide path while being radially contracted, move while inclining the snap ring, then again erect the snap ring, and press the snap ring while changing a posture of the snap ring to be pushed into the attachment groove; and
   a driving mechanism that exerts driving force to generate pressing force in the posture changing and pressing mechanism.

2. The snap ring attachment according to claim 1, wherein the posture changing and pressing mechanism includes a movable rod reciprocable in the guide cylinder, a pressing and oscillating ring that is coupled with the movable rod to allow an oscillating motion thereof on an oscillation axis line vertical to an extending direction of the guide cylinder and is configured to press the snap ring, and a restricting portion provided to the movable rod so as to regulate the pressing and oscillating ring to the upright state vertical to the extending direction and a predetermined inclined state.

3. The snap ring attachment according to claim 2, wherein the oscillation axis line of the pressing and oscillating ring is always located at a position offset from a central axis line of the guide path when the movable rod reciprocates in the guide cylinder.

4. The snap ring attachment according to claim 2, wherein the movable rod has a protruding portion that penetrates and extends through the pressing and oscillating ring.

5. The snap ring attachment according to claim 2, wherein the movable rod has a two-surface portion that defines planes parallel to each other, and the pressing and oscillating ring has a substantially rectangular opening portion into which the two-surface portion is inserted to allow the oscillating motion thereof on the oscillation axis line vertical to the two-surface portion.

6. A snap ring attaching tool that defines a guide path through which a C-type snap ring having a gap is guided toward an attachment groove of a workpiece, wherein the guide path is formed to have a region of a supply port side, to which the snap ring is supplied, having a circular cross section and a region of an exit side, from which the snap ring is pushed out, having an elliptic cross section, the circular cross section continuously varying to the elliptic cross section, in order to accept a posture changing and pressing mechanism that presses the snap ring supplied in an upright state vertical to an extending direction of the guide path while being radially contracted, moves while inclining the snap ring, then again erects the snap ring, and presses the snap ring while changing a posture of the snap ring to be pushed into the attachment groove.

7. The snap ring attaching tool according to claim 6, wherein the guide path is formed in such a manner that a center of the circular cross section is located on a central axis line of the guide path and a center of the elliptic cross section is offset from the center of the circular cross section.

\* \* \* \* \*